United States Patent
Ding et al.

(10) Patent No.: US 9,367,190 B2
(45) Date of Patent: Jun. 14, 2016

(54) TOUCH RECOGNITION METHOD AND SYSTEM FOR A CAPACITIVE TOUCH APPARATUS

(71) Applicants: APEX MATERIAL TECHNOLOGY CORP., Keelung (TW); IMAGINATION BROADWAY LTD., New Taipei City (TW)

(72) Inventors: Ke-hao Ding, Keelung (TW); Zong-Bin Liao, Keelung (TW); Zhong-peng Qiu, Keelung (TW); Shang-Li Lee, Keelung (TW)

(73) Assignees: APEX MATERIAL TECHNOLOGY CORP., Keelung (TW); IMAGINATION BROADWAY LTD., New Taipei (TW)

( * ) Notice: Subject to any disclaimer, the term of this patent is extended or adjusted under 35 U.S.C. 154(b) by 159 days.

(21) Appl. No.: 14/486,049

(22) Filed: Sep. 15, 2014

(65) Prior Publication Data

US 2015/0077389 A1     Mar. 19, 2015

Related U.S. Application Data

(60) Provisional application No. 61/900,989, filed on Nov. 6, 2013.

(30) Foreign Application Priority Data

Sep. 13, 2013  (TW) .............................. 102133071 A
Mar. 12, 2014  (TW) .............................. 103108570 A

(51) Int. Cl.
*G06F 3/045*     (2006.01)
*G06F 3/044*     (2006.01)
*G06F 3/041*     (2006.01)

(52) U.S. Cl.
CPC .............. *G06F 3/044* (2013.01); *G06F 3/0416* (2013.01); *G06F 3/0418* (2013.01)

(58) Field of Classification Search
CPC ...... G06F 3/044; G06F 3/0416; G06F 3/0418
USPC ........................................ 345/174; 178/18.06
See application file for complete search history.

(56) References Cited

U.S. PATENT DOCUMENTS

| | | | | |
|---|---|---|---|---|
| 2009/0303198 A1* | 12/2009 | Yilmaz | ................... | G06F 3/044 345/173 |
| 2009/0303203 A1* | 12/2009 | Yilmaz | ................... | G06F 3/044 345/174 |
| 2010/0096193 A1* | 4/2010 | Yilmaz | ................... | G06F 3/044 178/18.06 |
| 2010/0097077 A1* | 4/2010 | Philipp | ................... | G06F 3/044 324/678 |

(Continued)

*Primary Examiner* — Adam J Snyder
(74) *Attorney, Agent, or Firm* — WPAT, PC; Justin King

(57) ABSTRACT

The present invention discloses a method and system for touch signal recognition adapted to be used in a capacitive touch panel or apparatus. In order to achieve an objection of enhancement of a touch signal for recognition and getting rid of noise impact simultaneously, the present invention discloses a touch recognition method that actually includes two different measurement cycles to acquire two different sample voltage values. Consequently, noise impact can be removed by calculation of a sample voltage value difference between two different sample voltage values, at the same time, and the sample voltage value difference can provide a double magnitude as disclosed in the prior art to enhance accuracy for recognizing a user touch input while preventing from influence of noise.

20 Claims, 9 Drawing Sheets

(56) References Cited

U.S. PATENT DOCUMENTS

2010/0097078 A1* 4/2010 Philipp .................. G06F 3/044
324/684

2010/0139991 A1* 6/2010 Philipp .................. G06F 3/044
178/18.06

2010/0214259 A1* 8/2010 Philipp .................. G06F 3/044
345/174

* cited by examiner

TOUCH RECOGNITION METHOD AND SYSTEM FOR A CAPACITIVE TOUCH APPARATUS

CROSS-REFERENCE TO RELATED APPLICATIONS

The present application claims the benefit of priority to Taiwan patent application No. 102133071 filed Sep. 13, 2013; Taiwan patent application No. 103108570 filed Mar. 12, 2014; and U.S. Provisional Patent Application No. 61/900,989 filed Nov. 6, 2013, which are all hereby incorporated, in their entirety, herein by reference.

FIELD OF THE INVENTION

The present invention pertains to touch recognition for a capacitive touch apparatus, and more particularly pertains to touch recognition method and system which can improve the accuracy of touch recognition for a capacitive touch apparatus by modification of charging electrodes of the capacitive touch apparatus.

BACKGROUND OF THE INVENTION

The existing capacitive touch apparatus, for example, applied to a typical portable terminal, comprises a data processing module and a touch screen including a touch panel and a display unit. A capacitive touch panel that allow multiple fingers to be detected generally includes driving electrodes arranged in parallel with one another and sensing electrodes arranged in parallel with one another across the driving electrodes in pairs. When the driving electrodes are driven, electric fields are formed between the driving electrodes and the sensing electrodes so that a mutual capacitor is formed at each intersection between one of the driving electrodes and its paired one of the sensing electrodes. The mutual capacitance includes intrinsic capacitance formed by that an electric field is free from external influence, and variable capacitance formed by that the electric field is subject to external influence. When the touch screen is touched, the finger or the special touch object changes the electric field to change the variable capacitance. The touch panel performs a scanning operation for a predetermined time interval period to collect touch events, and the touch panel converts a contact position into an electrical signal by sensing a change in capacitance formed by the electric field subject to external influence when a user's hand or object contacts the touch screen panel. The change of the mutual capacitance value coupling between X and Y axis electrode on the capacitive touch panel is sensed through the data processing module for judging the touched position of the touch panel to convert the contact position into the electrical signal. Accordingly, a baseline voltage which is the average voltage over an interval of time is measured at intersections in order to correlate touched X and Y electrodes into (X,Y) coordinate pairs when there is at least substantially no local electrostatic field generated by the touch of an instrument. When an instrument (e.g., finger) is applied proximal to the touch panel, a slight change in the output voltage magnitude is detected by the data processing module. The data processing module is controlled by at least one CPU (Central Processing Unit), such as computer, PDA (Personal Digital Assistant), various digital video players with display screens, etc.

As an example of conventional capacitive touch control, a coupling plate is provided and disposed to form a touch sensitive switch in WO-97/23738. In accordance with this example, a measurement cycle is performed that the coupling plate referred to as a key is charged using a drive circuit for a drive part of a measurement cycle and then this charge is measured by transferring the induced charge from the key to a charge measurement capacitor of a charge detection circuit. The charging and transferring parts of the cycle can vary widely and can be selected in accordance with the application concerned. Typically, a burst of measurement cycles are used to generate a plurality of signal sample values. The sensor can detect the presence of an object near the key as a result of a change in an amount of the charge induced onto the key, even in the presence of interfering substances.

Another form of touch sensitive control is disclosed in WO 00/44018. In this example a pair of electrodes is provided which act as a key so that the presence of a body such as a user's finger is detected as a result of a change in an amount of charge which is transferred between the two electrodes. With this arrangement, one of the electrodes (labeled X) is driven with a drive circuit and the other of the pair of electrodes (labeled Y) is connected to a charge measurement circuit which detects an amount of charge present on the Y plate when driven by the X plate. As disclosed in WO-00/44018 several pairs of electrodes can be arranged to form a matrix of sensing areas which can provide an efficient implementation of a touch sensitive two-dimensional position sensor. Such two dimensional capacitive transducing sensors are typically used with devices which include touch sensitive screens or touch sensitive keyboards/keypads which are used in, for example, consumer electronic devices and domestic appliances.

The induced electric fields between driving electrodes and sensing electrodes for a touch panel are vulnerable to be influenced by exogenous noises so that it can cause a disruption in accurately measuring a change in an amount of charge transferred due to touching the panel by an object (e.g., finger). The prior art touch sensing and measurement techniques have disclosed a signal subtraction method for reducing background noise impact as determining whether or not a touch has occurred. Firstly, prior to driving the touch pane, a signal A is acquired by measuring the potential of the sensing electrodes, and subsequently the driving electrodes is charged with a pre-determined current for a pre-determined time and then a signal B is acquired by measuring the potential of the sensing electrodes. Next, the signal subtraction method performs a subtraction operation to subtract signal B from signal A for acquiring a signal C. Finally, signal C is compared with a threshold value (e.g., a touch detection threshold), and signal C is determined to be a touch signal when signal C is above the threshold value. The charging and measurement procedures continue to be repeated as determining whether or not a touch has occurred.

A method of removing or at least reducing the effects of noise to improve the accuracy with which a signal measurement taken from a capacitively charged key is disclosed in U.S. Pat. No. 8,378,981. It provided a method and apparatus for sensing the presence of a body from a change in an amount of charge present on a capacitively charged key. The method includes performing a measurement burst which generates a plurality of signal sample values from a plurality of measurement cycles. Only those of the plurality of signal sample values, which are within the determined accepted range are used to detect whether the body is present by removing or at least reducing the effects of signal sample values, which are outside the determined accepted range of values. As a result, the effects of noise, such as square wave noise, which might otherwise cause the touch sensor to erroneously detect a body, can be substantially reduced.

The above-mentioned disclosures have provided methods for sensing the presence of a body from a change in an amount of charge present on a capacitively charged key and even improving the accuracy with which a signal measurement taken from a capacitively charged key by removing or at least reducing the effects of noise. However, the conventional measurement method may still make some mistakes to distinguish a touch signal as a result of fingers from a result of other conductive objects such as dirt, water or dust because the amount of voltage variation measured between them are not large difference. There is still a need of accurate recognition of user touch input while preventing from influence of noise signals.

SUMMARY OF THE PRESENT INVENTION

Aspects of the present invention are to address at least the above-mentioned problems and/or disadvantages and to provide at least the advantages described below. Accordingly, an aspect of the present invention is to provide a method and system, which can improve an accuracy of touch signal recognition especially under a challenging environment to distinguish a touch signal as a result of fingers from a result of other conductive objects such as dirt, water or dust. Furthermore, the present invention prevents from influence of noise signals and adapted to be used in a capacitive touch panel or a capacitive touch apparatus while.

In accordance with an aspect of the present invention, a method for touch signal recognition adapted to be used in a capacitive touch panel is provided. The method comprises acquiring a plurality of first sample voltage values from a plurality of first measurement cycles, each of the first measurement cycle comprising: (1) charging the driving electrode to a High electric potential by supplying a driving current to the driving electrode, wherein the sensing electrode is configured in a floating potential; (2) measuring the sensing voltage on the sensing electrode with a charge sensing circuit, wherein the sensing electrode is configured in a floating potential and coupled to the charge sensing circuit; acquiring a plurality of second sample voltage values from a plurality of second measurement cycles, each of the second measurement cycle comprising: (1) charging the sensing electrode for a predetermined time interval by supplying a charging current while the driving electrode is driven continuously at the High electric potential, wherein the sensing electrode is configured in the floating potential and switched to be coupled to an charging circuit; (2) terminating charging the sensing electrode, wherein the sensing electrode is configured continuously in the floating potential; (3) measuring the sensing voltage on the sensing electrode with the charge sensing circuit, wherein the sensing electrode is configured in a floating potential and coupled to the charge sensing circuit while the driving electrode is switched to be configured in a ground potential; and generating a sensing signal by calculating and processing a plurality of difference sample voltage values between the first sample voltage values and the second sample voltage values, wherein the sensing signal is defined as a baseline signal if there is no any finger or other object in close proximity to the surface of the capacitive touch panel.

In accordance with another aspect of the present invention, a capacitive sensor device is provided. The capacitive sensor device comprises a plurality of driving electrodes and a plurality of sensing electrodes; and a processing system coupled to the capacitive sensors, said processing system for touch signal recognition is configured to: acquire a plurality of first sample voltage values from a plurality of first measurement cycles, each of the first measurement cycle comprising: (1) charging the driving electrode to a High electric potential by supplying a driving current to the driving electrode, wherein the sensing electrode is configured in a floating potential; (2) measuring the sensing voltage on the sensing electrode with a charge sensing circuit, wherein the sensing electrode is configured in a floating potential and coupled to an charge sensing circuit; acquire a plurality of second sample voltage values from a plurality of second measurement cycles, each of the second measurement cycle comprising: (1) charging the sensing electrode for a predetermined time interval by supplying a charging current while the electrode is configured in the floating potential and switched to be coupled to an charging circuit; (2) terminating charging the sensing electrode, wherein the sensing electrode is configured continuously in the floating potential; (3) measuring the sensing voltage on the sensing electrode with the charge sensing circuit, wherein the sensing electrode is configured in a floating potential and coupled to the charge sensing circuit while the driving electrode is switched to be configured in a ground potential; and generate a sensing signal by calculating and processing a plurality of difference sample voltage values between the first sample voltage values and the second sample voltage values, wherein the sensing signal is defined as a baseline signal if there is no any finger or other object in close proximity to the surface of the capacitive touch panel.

In accordance with another aspect of the present invention, a capacitive touch apparatus is provided. The capacitive touch apparatus comprises a capacitive touch screen unit which comprises a plurality of driving electrodes and a plurality of sensing electrodes to form a plurality of capacitive sensors for sensing a touch; a driving circuit operable to drive the driving electrodes for inducing charge onto the capacitive sensors; a charge sensing circuit operable to perform a charge measurement; a charging circuit operable to supply a charging current to the sensing electrodes; and a control unit coupled to the driving circuit, the charge sensing circuit, and the charging circuit, wherein the control unit controls the driving electrodes and the sensing electrodes to be initially configured in a ground potential and the controller is operable to perform operations for touch signal recognition comprising: controlling the driving electrodes to be charged to a High electric potential by the driving circuit and the capacitive sensors sequentially measured with the charge sensing circuits to acquire the first sample voltage values, wherein the sensing electrodes are controlled to be configured in a floating potential and coupled to the charge sensing circuits; controlling the sensing electrodes to be charged for a predetermined time interval with the charging circuit while the driving electrodes are charged continuously at the High electric potential, wherein the sensing electrodes are controlled to be configured in the floating potential and coupled to the charging circuit; controlling the sensing electrodes to terminate charging with the charging circuit and the capacitive sensors sequentially measured with the sensing circuit to acquire the second sample voltage values, wherein the sensing electrodes are configured continuously in the floating potential as well as coupled to the charge sensing circuit while the driving electrodes are switched to be configured in a ground potential; and processing to generate a sensing signal by calculating a plurality of difference sample values between the first sample voltage values and the second sample voltage values, wherein the sensing signal is defined as a baseline signal if there is no any finger or other object in close proximity to the surface of the capacitive touch panel.

According to an embodiment of the present invention, a sensing signal is defined as a contact signal if there are fingers or any other objects in close proximity to the surface of a capacitive touch panel, or a capacitive touch sensor, or a capacitive touch screen while the sensing signal is defined as a baseline signal if there is no finger or other object in close proximity to the surface of the capacitive touch panel. A touch signal is acquired by calculation of a signal difference between the contact signal and the baseline signal, and the voltage magnitude of the touch signal must be above or equal to a default threshold value to be recognized to be a valid signal and outputted, otherwise the touch signal is discarded.

Other aspects, advantages, and salient features of the invention will become apparent to those skilled in the art from the following detailed description, which, taken in conjunction with the annexed drawings, discloses exemplary embodiments of the invention.

DETAILED DESCRIPTION OF THE INVENTION

Reference will now be made in detail to embodiments of the present invention, examples of which are illustrated in the accompanying drawings. While the present invention will be described in conjunction with embodiments, it will be understood that the descriptions are not intended to limit the present invention to these embodiments. On the contrary, the descriptions are intended to cover alternatives, modifications and equivalents, which may be included within the spirit and scope as defined by the appended claims. Furthermore, in the following detailed description, numerous specific details are set forth in order to provide a thorough understanding of embodiments of the present invention. However, one of ordinary skill in the art will understand that embodiments of the present invention may be practiced without these specific details. In other instances, well known methods, procedures, components, and circuits have not been described in detail as not to unnecessarily obscure aspects of the present invention.

Figure 1:
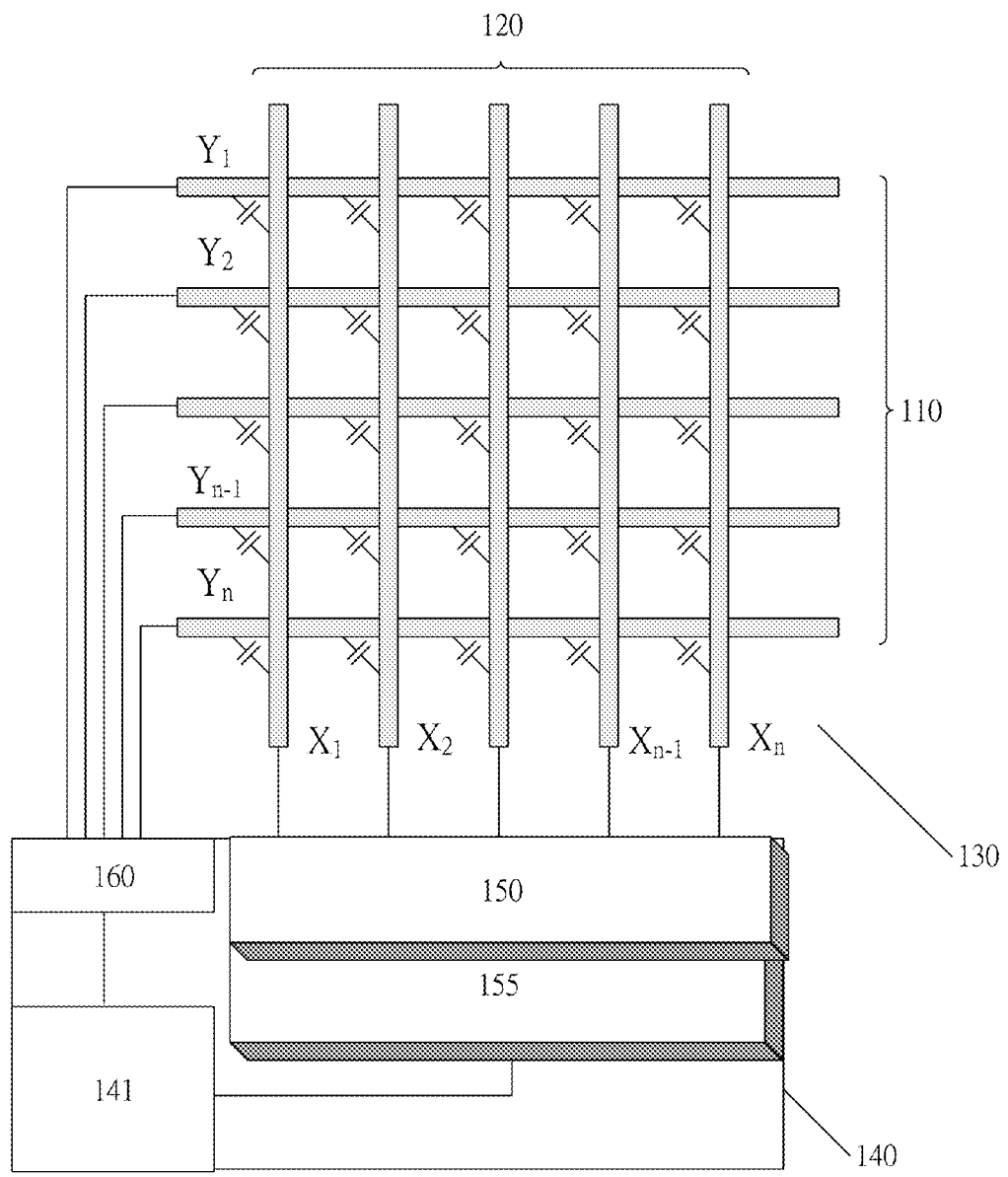
FIG. 1 illustrates a simplified schematic view of a capacitive touch panel according to an embodiment of the present invention.

Referring to FIG. 1, a simplified schematic view of a capacitive touch panel according to an embodiment of the present invention includes a circuit pattern, made of two distinct layers of conductive materials, formed on a substrate. The circuit pattern 130 of the panel with a look like a grid includes one layer housing a plurality of electrode strips arranged in parallel with one another $(X_1, X_2, \ldots X_{n-1}, X_n)$ 120 on X-axis and the other housing a plurality of electrode strips arranged in parallel with one another $(Y_1, Y_2, \ldots Y_{n-1}, Y_n)$ 110 on Y-axis. The driving electrodes 110 and the sensing electrodes 120 are spatially separated, therefore forming a capacitor in between. The circuit pattern 130 forming a plurality of capacitive sensors at intersection is electrically connected to a controller 140 to carry out a touch function.

The controller 140 includes at least a control unit 141, a charge sensing circuit 150, and a driving circuit 160. The charge sensing circuit 150 may include an Analog to Digital (A/D) Converter, which can receive an analog voltage signal from the charge onto the capacitive sensors and samples the analog voltage signal to produce a plurality of digital voltage values. When the capacitance of a human finger is added to the touch panel, the result is a lowering of the voltage seen by the A/D converter. The control unit 141 is electrically coupled to the driving circuit 160, the charge sensing circuit 150, and the charging circuit 155. The sensing circuit 150 and the charging circuit 155 are electrically connected to the electrodes 120. The driving circuit 160 is electrically connected to the driving electrodes 110. When the controller 140 enables a voltage applied to the driving electrodes 110 with the driving circuit 160, electric fields are formed between the driving electrodes 110 and the sensing electrodes 120. When a conductive object, such as a finger, comes into contact with the panel, it distorts the local electrostatic field at that point due to reducing the mutual capacitance. This is measurable with the charge sensing circuit 150 as a change in mutual capacitance. The mutual capacitance can be changed and measured at every individual point on the intersections, and the controller 140 combines with a processing system can analyze the acquired voltage values and accurately determine the touch location.

In one of the embodiment of the present invention, the touch detection for a panel with the circuit pattern 130 comprises scanning the sensing electrodes $(X_1, X_2, \ldots X_{n-1}, X_n)$ 120 during a driving signal is supplied to the driving electrodes $(Y_1, Y_2, \ldots Y_{n-1}, Y_n)$ 110. It is executable to scan one row or column of the sensing electrodes at one time by using the charge sensing circuit 150 to obtain the individual voltage values for each row or column, alternatively, to scan two or more rows or columns of the sensing electrodes at one time by using the charge sensing circuit 150 to obtain more sample voltage values at the same time. Subsequently, the obtained voltage values are processed and thereby a sensing signal is generated. The controller 140 is operable to determine whether the sensing signal is a valid touch signal comparing with a default threshold signal level otherwise ignored. The controller 140 is also operable to output the touch signal on the output connection.

FIG. 2a-2e illustrate the operations to create a sensing voltage for a capacitive touch sensor according to an embodiment of the present invention. Combining reference to FIG. 1 and FIG. 2a-2e, FIG. 2a illustrates the driving electrode 21 and the sensing electrode 22 as a pair of electrodes of a capacitive touch panel shown in FIG. 1. The driving electrode 21 is coupled to a driving line 20 which is configured in a Low electric potential, and the sensing electrode 22 is coupled to a sensing line 23 which is configured in a ground potential (GND). At this moment, no any electric field has been induced.

Figure 2A:
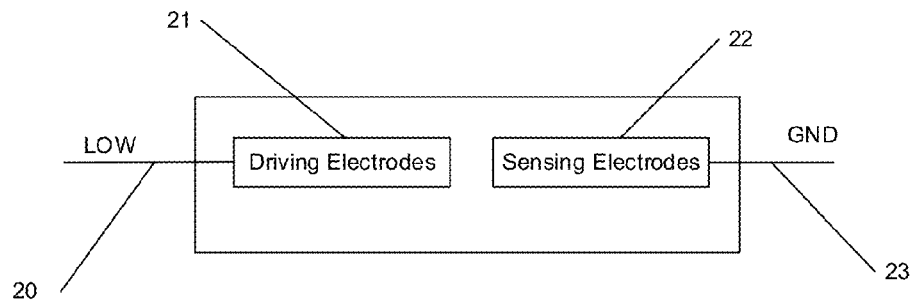
FIG. 2a-2e illustrate the operations to create a sensing voltage for a capacitive touch sensor according to an embodiment of the present invention.
Figure 2B:
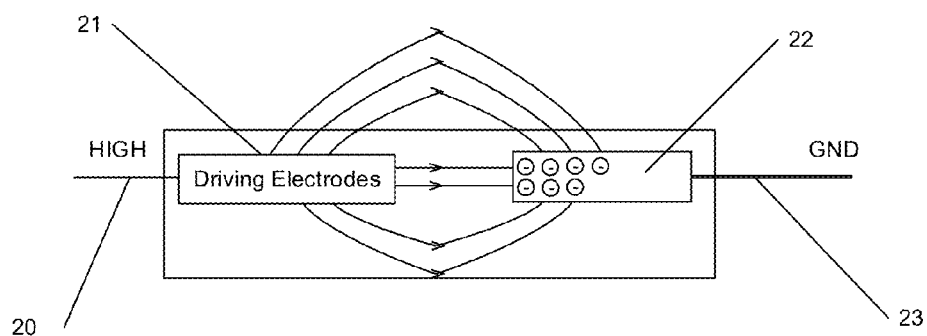
Figure 2C:
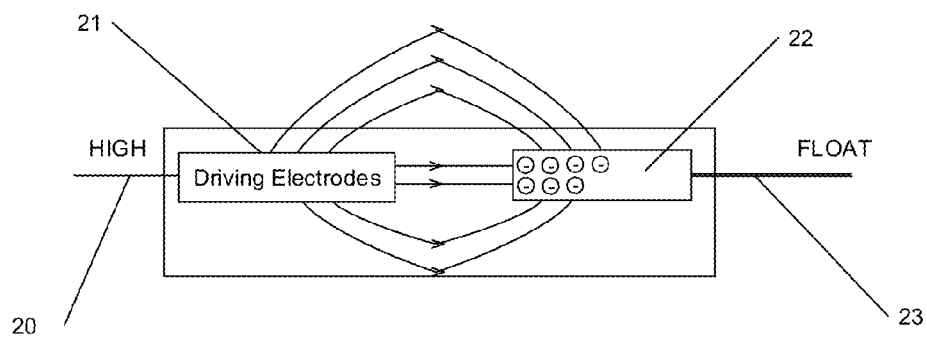

FIG. 2b illustrates the driving electrode 21 connected to a driving line 20 which is configured in a HIGH electric potential, and the sensing electrode 22 is coupled to a sensing line 23 which is configured in a ground potential (GND). At this moment, though there is an induced electric field between the driving electrode 21 and the sensing electrode 22, the sensing electrode is still in a status of charge neutralization due to the sensing line 23 which is still configured in a ground potential (GND). Consequently, there is no change for the sensing voltage FIG. 2c illustrates the driving electrode 21 connected to a driving line 20 which is configured in a HIGH electric potential, and the sensing electrode 22 is coupled to a sensing line 23 which is configured in a floating potential (FLOAT) and coupled to the charge sensing circuit 150. At this moment, though there is an induced electric field between the driving electrode 21 and the sensing electrode 22, the sensing electrode 22 is still electrically neutral under the action of a stable electric field. Consequently, there is no significant variation in term of the sensing voltage.

Figure 2D:
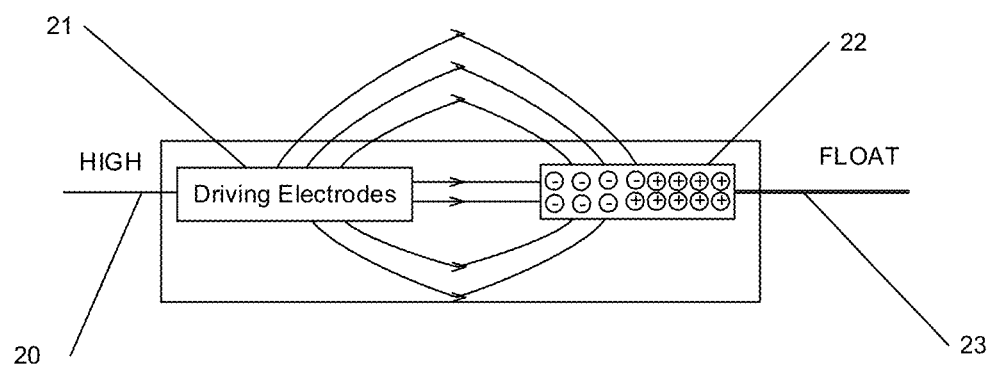

FIG. 2d illustrates the driving electrode 21 connected to a driving line 20 which is configured in a HIGH electric potential, and the sensing electrode 22 is coupled to a sensing line 23 which is configured in a floating potential (FLOAT) and couple to the charging circuit 155. The charging method can be defined with a constant-current charging within a certain time interval to result in a predetermined amount of charge upon completion of charging; Alternatively, the charging method can be defined with a predetermined voltage magnitude for charging with a uncertain time interval; once the predetermined voltage magnitude is reached, the charging is terminated. At this moment, the stable induced electric field between the driving electrode 21 and the sensing electrode 22 can be maintained, the sensing electrode can hold the certain amount of charge.

Figure 2E:
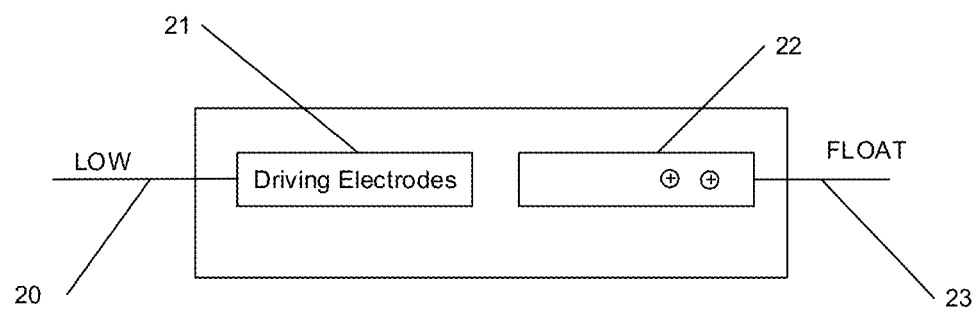

FIG. 2e illustrates the driving electrode 21 connected to a driving line 20 which is configured in a LOW electric potential, and the sensing electrode 22 is coupled to the sensing line 23 which is configured in a floating potential (FLOAT) and couple to the charge sensing circuit 150. Due to the induced electric fields vanishing, the action of charge neutralization is occurred to make the originally negative charges bound by the electric field neutralized with the generated positive charges as shown in FIG. 2d. Through the action of charge neutralization, the remained non-neutralized positive charges create a positive voltage. At this moment, the charge sensing circuit can receive an analog voltage signal via the sensing line 23 and sample the analog voltage signal to produce a plurality of digital voltage values.

FIG. 3a-3e illustrates the operations to create a sensing voltage for a capacitive touch sensor if there is a finger or other conductive object in close proximity or touch to the surface of the capacitive touch sensor according to an embodiment of the present invention. Combining reference to FIG. 1 and FIG. 3a-3e, FIG. 3a illustrates the driving electrode 21 and the sensing electrode 22 as a pair of electrodes of a capacitive touch panel shown in FIG. 1. The driving electrode 21 is coupled to a driving line 20 which is configured in a Low electric potential, and the sensing electrode 22 is coupled to a sensing line 23 which is configured in a ground potential (GND). At this moment, no any electric field has been induced.

Figure 3A:
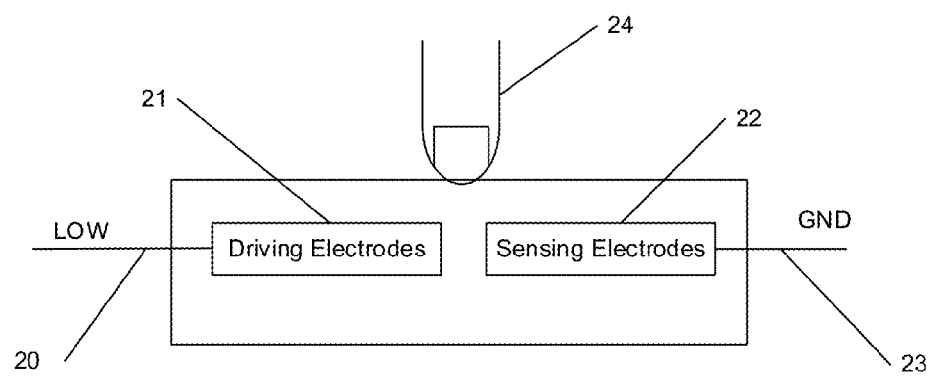
FIG. 3a-3e illustrate the operations to create a sensing voltage for a capacitive sensor if there is a finger or other conductive object in close proximity or touch to the surface of the capacitive touch sensor according to an embodiment of the present invention.
Figure 3B:
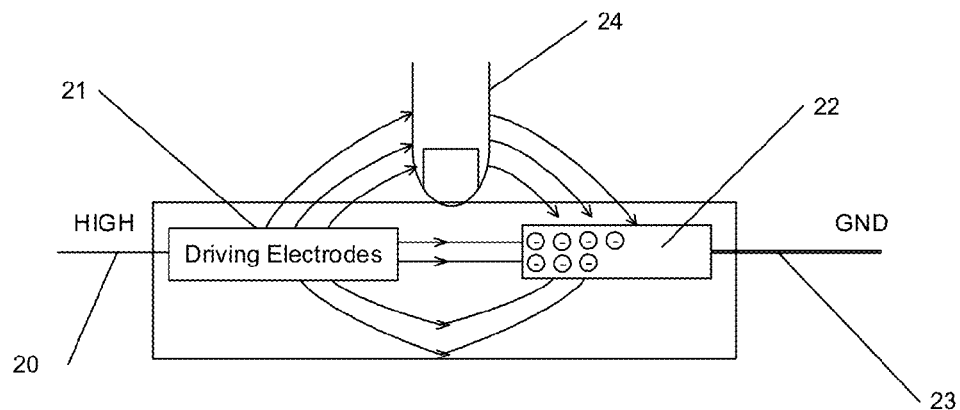

FIG. 3b illustrates the driving electrode 21 connected to a driving line 20 which is configured in a HIGH electric potential, and the sensing electrode 22 is coupled to a sensing line 23 which is configured in a ground potential (GND). At this moment, though there is an induced electric field between the driving electrode 21 and the sensing electrode 22 as well as having a finger or other conductive object 24 in close proximity or touch to the surface of the capacitive touch sensor, the sensing electrode is still electrically neutral due to the sensing line 23 which is still configured in a ground potential (GND). Consequently, there is no significant change for the sensing voltage.

Figure 3C:
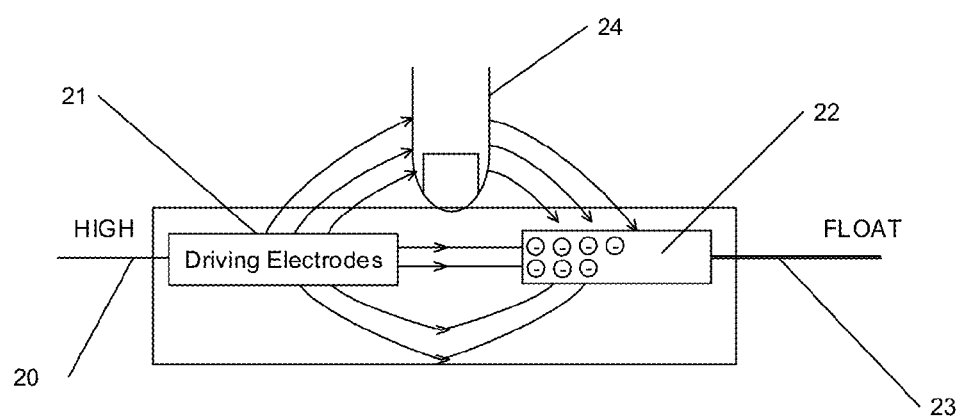

FIG. 3c illustrates the driving electrode 21 connected to a driving line 20 which is configured in a HIGH electric potential, and the sensing electrode 22 is coupled to a sensing line 23 which is configured in a floating potential (FLOAT) and coupled to the charge sensing circuit 150. At this moment, though there is an induced electric field between the driving electrode 21 and the sensing electrode 22, the sensing electrode 22 is still electrically neutral under the action of a stable electric field. However, the electric field can merely bind less negative charges if there is a finger or other conductive object 24 in close proximity or touch to interfere the electric field.

Figure 3D:
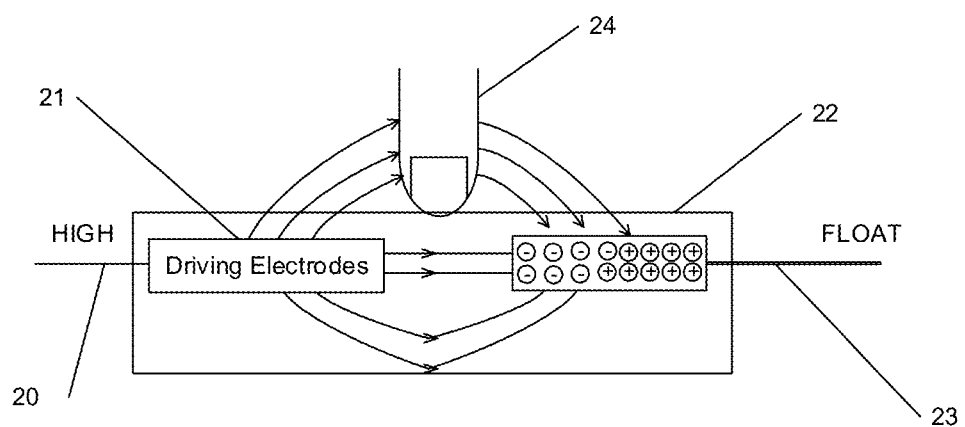

FIG. 3d illustrates the driving electrode 21 connected to a driving line 20 which is configured in a HIGH electric potential, and the sensing electrode 22 is coupled to a sensing line 23 which is configured in a floating potential (FLOAT) and couple to the charging circuit 155. The charging method can be defined with a constant-current charging within a certain time interval to result in a predetermined amount of charge upon completion of charging; Alternatively, the charging method can be defined with a predetermined voltage magnitude for charging with a uncertain time interval; once the predetermined voltage magnitude is reached, the charging is terminated. At this moment, though the electric field can merely bind less negative charges if there is a finger or other conductive object 24 in close proximity or touch, the sensing electrode can still hold the certain amount of charge from the charging action.

Figure 3E:
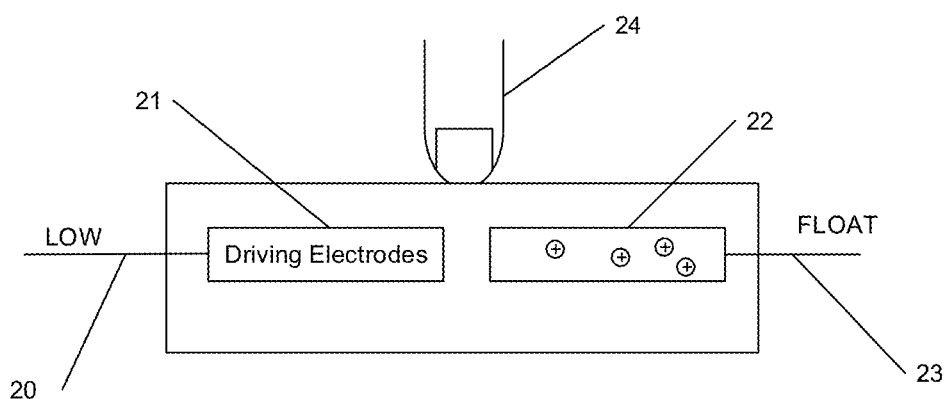

FIG. 3e illustrates the driving electrode 21 connected to a driving line 20 which is configured in a LOW electric potential, and the sensing electrode 22 is coupled to the sensing line 23 which is configured in a floating potential (FLOAT) and couple to the charge sensing circuit 150. Due to the induced electric fields vanishing, the action of charge neutralization is occurred to make the originally negative charges bound by the electric field neutralized with the generated positive charges as shown in FIG. 3d. Through the action of charge neutralization, the remained non-neutralized positive charges create a positive voltage. Due to having a finger or other conductive object 24 in close proximity or touch, the electric field can merely bind less negative charges. Therefore, when the induced electric fields vanish and the action of charge neutralization occurs, the sensing voltage signal received by the charge sensing circuit 150 has a larger value in comparison with the sensing voltage signal received in FIG. 2e. Next, the further processing can be carried out by a control unit to recognize a touch signal based on this manner.

As shown in FIG. 1, the control unit 141 can control the steps mentioned above in FIG. 2a-2e and FIG. 3a-3e to generate a sensing signal for recognizing a touch signal. The touch signal is recognized to be a valid signal and outputted when the voltage magnitude of the touch signal is above or equal to a default threshold value. When a touch signal has been recognized, the position information about the touch signal will be delivered to the host for response. The above-mentioned method described by FIG. 2a-2e and FIG. 3a-3e can be sequentially executed for each row of the driving electrodes ($Y_1, Y_2, \ldots Y_{n-1}, Y_n$) and each column of the sensing electrodes ($X_1, X_2, \ldots X_{n-1}, X_n$) as shown in FIG. 1. The capacitance measurement channels banks provided by the charge sensing circuit 150 coupled to the columns of sensing electrodes ($X_1, X_2, \ldots X_{n-1}, X_n$) as shown in FIG. 1. However, it will be appreciated that in practice all of the measurement channel circuitry may be provided in a single unit such as a programmable or application specific integrated circuit or more than one single unit.

Figure 4:
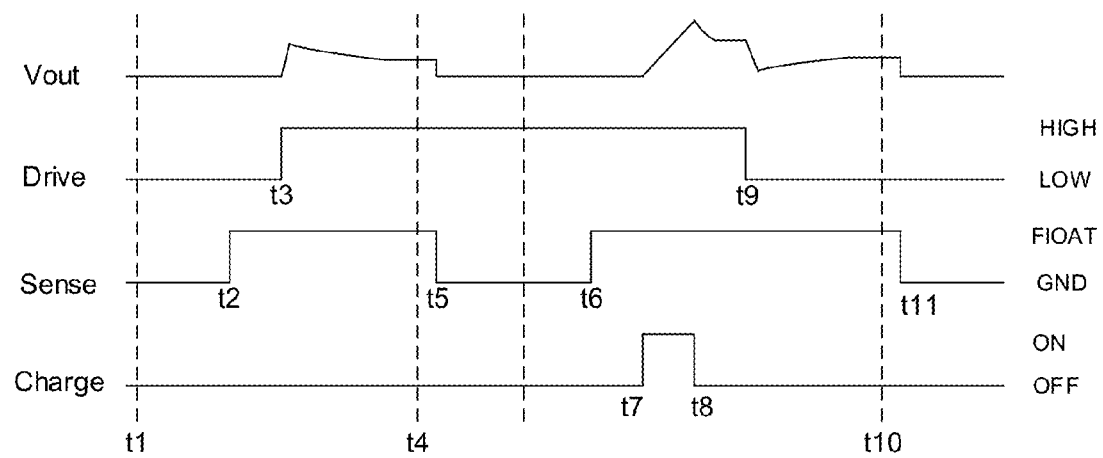
FIG. 4 illustrate timing diagrams about the several representative signals to perform a touch recognition method for a capacitive panel according to an embodiment of the present invention.
Figure 5A:
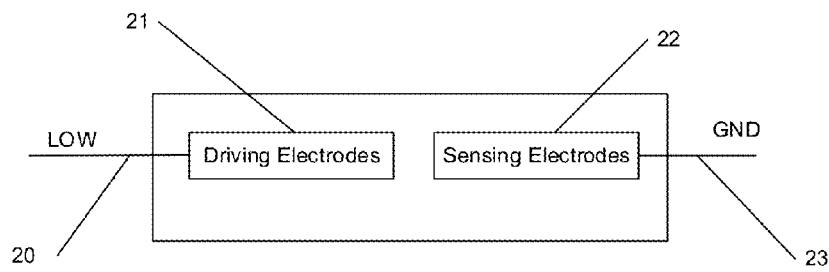
FIG. 5a-5g illustrate the operations to perform a touch recognition method for a capacitive sensor as shown in FIG. 4 according to an embodiment of the present invention.
Figure 5B:
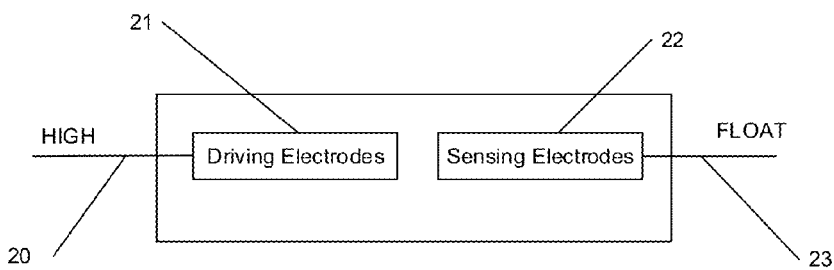
Figure 5C:
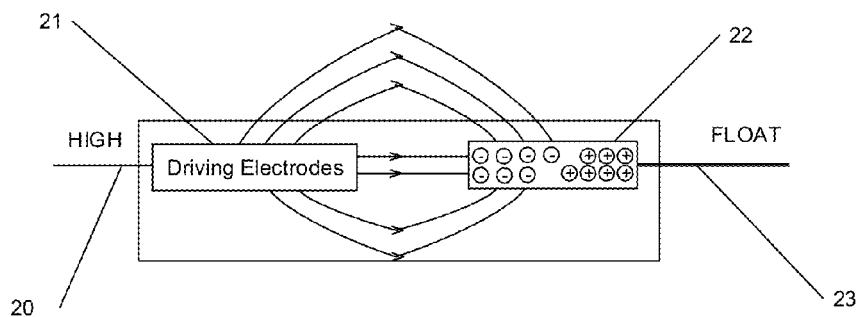
Figure 5D:
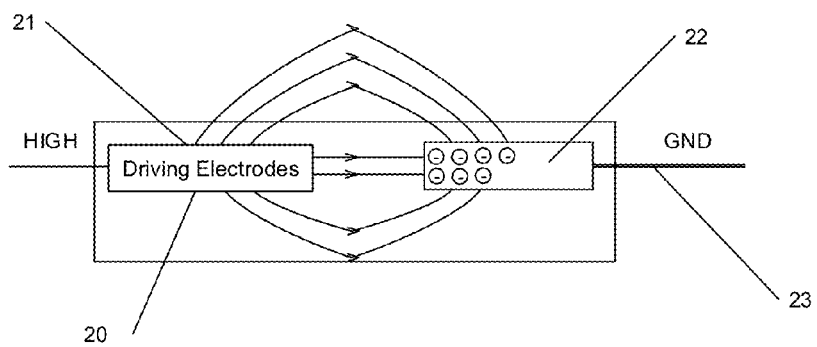
Figure 5E:
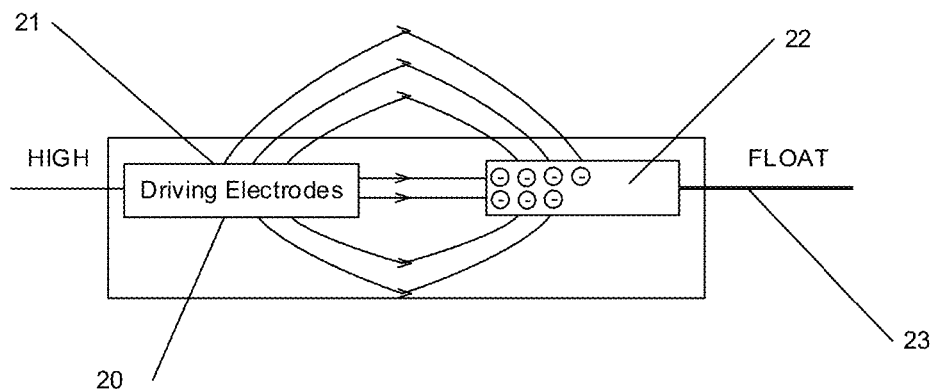
Figure 5F:
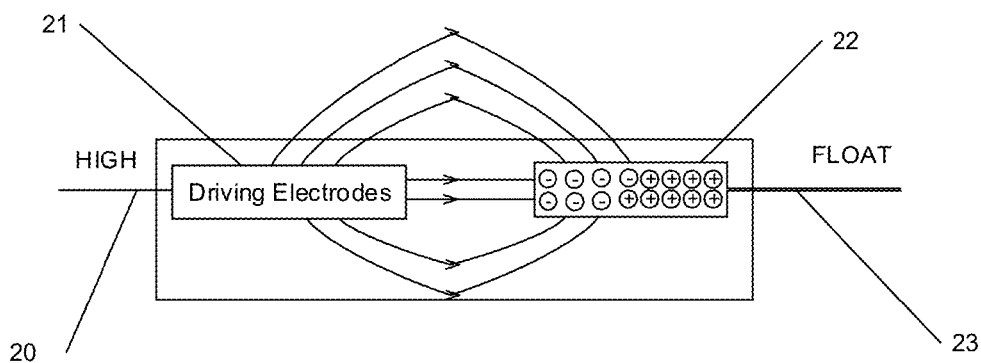
Figure 5G:
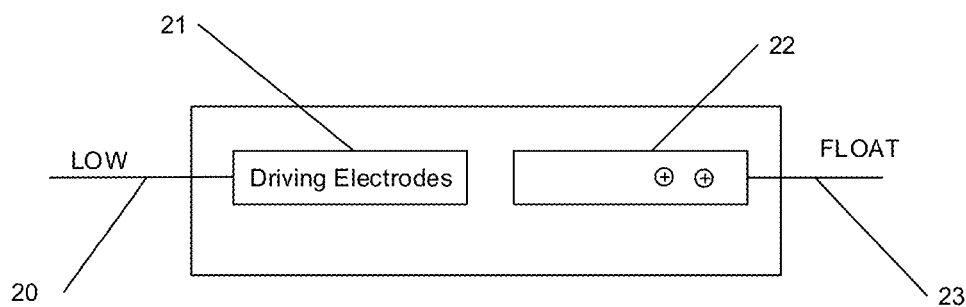

FIG. 4 illustrate timing diagrams about the several representative signals to perform a touch recognition method for a capacitive panel according to an embodiment of the present invention. Correspondingly referring to FIG. 5a-5g, what the operations to perform a touch recognition method for a capacitive sensor at every time point as shown in FIG. 4 and their results become easier to be understood. As shown in FIG. 4, Vout signal represents the sensing voltage received by the charge sensing circuit 150 as a change in a mutual capacitance between a driving electrode and a sensing electrode; Drive signal represents a switch between two voltage states supplied to the driving electrodes 110, i.e. a base electric potential (LOW electric potential) and a reference electric potential (HIGH electric potential), controlled by the control unit 141 according to a predetermined time interval; Sense signal represents a switch between two voltage states coupled to the sensing electrodes 120, i.e. a ground potential (GND) and a floating potential (FLOAT), controlled by the control unit 141; Charge signal represents an enabling signal for the charging circuit 155. The following description is mainly based on every time point from t1 to t11 as two measurement cycles, respectively a "forward" measurement cycle and a "reverse" measurement cycle, for touch signal recognition as shown in FIG. 4. It is noted that the "forward" measurement cycle and the "reverse" measurement cycle have no priority in order to perform for touch signal recognition. From the following description, it can be understood how and when to operate the driving electrodes 110, the sensing electrodes 120, the charge sensing circuit 150, the charging circuit 155, and the control unit 141 for the purpose of performing the touch recognition method.

Time t1-t2: At time t1, the control unit 141 controls the sensing electrodes 120 which are switched to be configured in from a ground potential (GND) to a floating potential (FLOAT). The timing diagrams indicates, correspondingly referring to FIG. 5a, an initialization status before performing a touch recognition method. The driving electrodes 110 driven by the driving circuit 160 are initially configured in a base electric potential (i.e. LOW electric potential) as shown in the Drive signal, and the sensing electrodes 120 are initially coupled to a ground potential (GND) as shown in Sense signal. At time t2, the charge sensing circuit 150 is initially turn off so that the Vout signal do not have any change. Next, referring to FIG. 5b, it indicates that a preparation status is about the several representative signals. The driving electrodes 110 driven by the driving circuit 160 are still configured in a base electric potential (i.e. LOW electric potential) as shown in the Drive signal, and the sensing electrodes 120 are coupled to a floating potential (FLOAT). The charge sensing circuit 150 is still turn off so that the Vout signal do not have any change.

Time t3: At time t3, the control unit 141 controls the driving electrodes 110 to be charged to a reference electric potential (HIGH electric potential) by supplying a driving current when the sensing electrodes 120 are continuously configured in the floating potential (FLOAT). The timing diagrams, correspondingly referring to FIG. 5c, indicates an activation status of a first measurement cycle. The driving electrodes 110 driven by the driving circuit 160 to a HIGH electric potential as shown in the Drive signal, and the sensing electrodes 120 are continuously configured in the floating potential (FLOAT) as shown in Sense signal. The charge sensing circuit 150 is still turned off, however, there are induced electric fields between the driving electrodes 110 and the sensing electrodes 120. Therefore, Vout signal representing a sensing voltage received by the charge sensing circuit 150 starts to change from a base potential once the charge sensing circuit 150 is turned on.

Time t4: At time t4, the control unit 141 controls to acquiring a plurality of first sample voltage values by measuring a plurality of sensing voltage values on the sensing electrodes 120 with the charge sensing circuit 150. To avoid acquiring unstable voltage signal values, the sensing voltage values on the sensing electrode 120 are measured when the sensing voltages on the sensing electrodes 120 have reached to their steady states. Accordingly, the first sample voltage value $V_1$ is acquired by processing where $V_1$ is the mean of the first sample voltage values.

Time t5: At time t5, the control unit 141 controls the sensing electrodes 120 which are switched to be configured in from the floating potential (FLOAT) back to the ground potential (GND). The timing diagrams, correspondingly referring to FIG. 5d, indicates a preparation status of a second measurement cycle. The sensing electrodes 120 are coupled to the ground potential (GND) as shown in Sense signal. The sensing electrodes 120 reach to be electrically neutral because their accumulated charges on the sensing electrodes 120 leak off to the ground. The Vout representing a sensing voltage received by the charge sensing circuit 150 is restored to be at a base potential. The so called "forward" measurement cycle can be represented herein from Time t2 to Time t5.

Time t6: At time t6, the control unit 141 controls the sensing electrodes 120 to be configured in the floating potential (FLOAT) when the driving electrodes 110 is driven continuously to a reference electric potential (HIGH electric potential). The timing diagrams, correspondingly referring to FIG. 5e, indicates an activation status of a second measurement cycle. The driving electrodes 110 driven by the driving circuit 160 to a HIGH electric potential as shown in the Drive signal, and the sensing electrode 120 are switched to be configured in the floating potential (FLOAT) as shown in Sense signal. The charge sensing circuit 150 is still turned off, however, there are induced electric fields between the driving electrodes 110 and the sensing electrodes 120. Therefore, Vout signal representing a sensing voltage received by the charge sensing circuit 150 starts to change from a base potential once the charge sensing circuit 150 is turned on.

Time t7-t9: At time t7, the control unit 141 controls to charge the sensing electrodes 120 with the charging circuit 155 and then control to terminate charging with the charging circuit 155. The timing diagrams, correspondingly referring to FIG. 5f, indicates that the sensing electrodes 120 are still configured in the floating potential (FLOAT) as shown in Sense signal and an enabling signal for the charging circuit 155 is turned ON as shown in Charge signal. At this moment, the sensing electrodes 120 are coupled to the charging circuit 155 and start to be charged. When accumulated charges on the sensing electrodes 120 are increasing, a result as shown in Vout signal is a rise of voltage. At time t8, the timing diagrams indicates that the enabling signal for the charging circuit 155 is turned OFF as shown in Charge signal. In other words, the sensing electrodes 120 are decoupled to the charging circuit 155 and terminate the charging. At time t9, the timing diagrams, correspondingly referring to FIG. 5g, indicates the driving electrodes 110 are switched to a base electric potential (LOW electric potential) the sensing electrodes 120 are still configured in the floating potential. The charging circuit 155 is turned off. Due to the induced electric fields between the driving electrodes 110 and the sensing electrodes 120 vanishing, the action of charge neutralization is occurred to make the originally negative charges bound by the electric field neutralized with the generated positive charges during time 7-8. When the action of charge neutralization has been occurred to result in a fall of voltage as shown in Vout signal.

Time t10: At time t10, the control unit 141 controls to acquiring a plurality of second sample voltage values by measuring a plurality of sensing voltage values on the sensing electrodes 120 with the charge sensing circuit 150. To avoid acquiring unstable voltage signal values, the sensing voltage values on the sensing electrode 120 are measured when the sensing voltages on the sensing electrodes 120 have reached to their steady states. Accordingly, the second sample voltage value $V_2$ is acquired by processing where $V_2$ is the mean of the second sample voltage values.

Time t11: At time 11, the control unit 141 controls the sensing electrodes 120 which are switched to be configured in from the floating potential (FLOAT) back to the ground potential (GND) in order to be ready for next touch recognition cycles which includes a forward measurement cycle and a reverse measurement cycle. The control unit 141 processes to generate a sensing signal by calculating a sample voltage value difference value between $V_1$ and $V_2$. The sensing signal is defined as a baseline signal by calculating a difference between the Mean of the first sample voltage values and if there is no finger or other object in close proximity to the surface of the capacitive touch panel. The so called "reverse" measurement cycle can be represented herein from Time t6 to Time t11.

Without any finger or other object present on the surface of a capacitive panel, a baseline signal $S_B$ can be obtained from the above-mentioned two measurement cycles at the outset. When there are fingers or other objects in close proximity to the surface of the capacitive touch panel, the sensing signal obtained from the above-mentioned touch recognition cycle is defined as a contact signal $S_F$. Accordingly, a touch signal $S_T$ is define as a signal difference between the contact signal $S_F$ and the baseline signal $S_B$. If there is any finger or other object in close proximity to the surface of the capacitive touch panel, the first sample voltage value $V_1$ obtained from the above-mentioned touch recognition cycle is generally smaller than the voltage value obtained upon a situation of no any fingers or other objects presence as described in FIG. 3c. However, if there is any finger or other object in close proximity to the surface of the capacitive touch panel, the second sample voltage value $V_2$ obtained from the above-mentioned touch recognition cycle is generally larger than the voltage value obtained upon a situation of no any fingers or other objects presence in FIG. 3e.

Regardless of the first sample voltage value $V_1$ or the second sample voltage value $V_2$, noise impact for $V_1$ and $V_2$ is the same. The measured values of $V_1$ and $V_2$ may increase or decrease with noise simultaneously. Consequently, noise impact can be removed by calculation of a sample voltage value difference between $V_1$ and $V_2$ at the same time, and the sample voltage value difference can provide a double magnitude as disclosed in the prior art touch sensing and measurement to enhance accuracy for recognizing a user touch input while preventing from influence of noise. Besides, the present invention can improve the problem about distinguishing a touch signal as a result of fingers from a result of other conductive objects such as dirt, water or dust. Due to the measured voltage with a double magnitude as disclosed by the conventional measurement method, the accuracy of recognizing a user touch input can be much improved. Furthermore, the present invention does not require to obtain a baseline signal during performing each measurement cycle (known as a requirement of prior art) since the baseline signal has been obtained at the outset upon a situation of no any fingers or other objects presence. The present invention not only offers accuracy for recognizing a user touch input and much saving in time consuming for measurement and processing of touch signal recognition.

Figure 6:
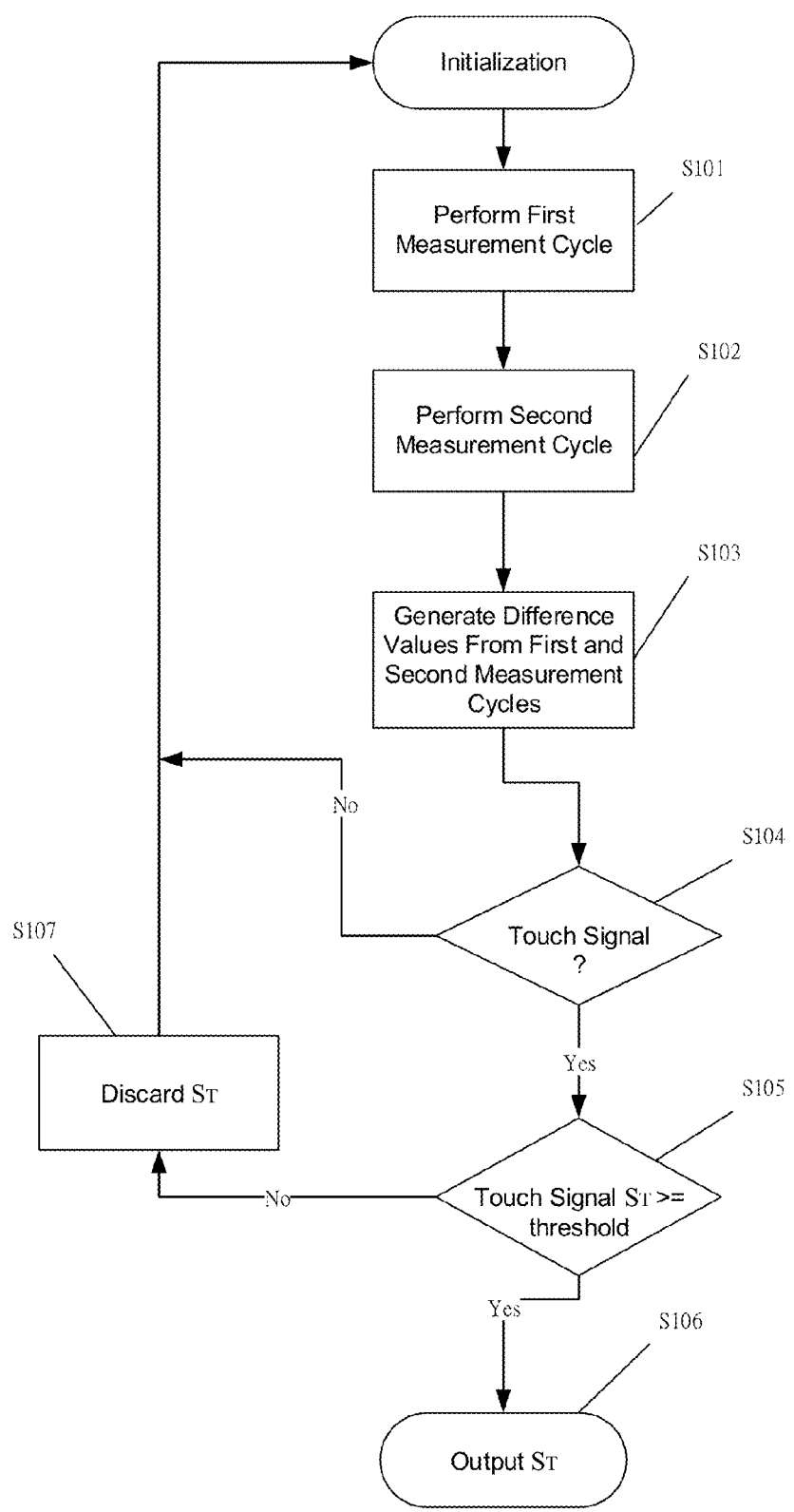
FIG. 6 illustrates a flow chart of a procedure for performing a touch recognition method applied to the capacitive touch panel illustrated in FIG. 1, according to an exemplary embodiment of the present invention.

FIG. 6 illustrates a flow chart of procedures for performing a touch recognition method applied to the capacitive touch panel 130 illustrated in FIG. 1, according to an exemplary embodiment of the present invention. In order to achieve an objection of enhancement of a touch signal for recognition and getting rid of noise impact simultaneously, the present invention discloses a touch recognition method that actually includes two different measurement cycles. Before the procedure is executed, the capacitive touch panel having a plurality of driving electrodes and a plurality of sensing electrodes must be initialized.

In step S101, the controller 140 performs a plurality of first measurement cycles to acquire a plurality of first sample voltage values, the measured sample voltage values get smaller if there are fingers or any other objects in close proximity to the surface of the capacitive touch panel during this step. Next, in step S102, the controller 140 performs a plurality of second measurement cycles to acquire a plurality of second sample voltage values, and the measured sample voltage values get larger if there are fingers or any other objects in close proximity to the surface of the capacitive touch panel during this step. Then, the controller 140 generates a sensing signal with calculation and processing of a plurality of difference sample voltage values between the first sample voltage values and the second sample voltage values performs in step S103.

According to an embodiment of the present invention, a sensing signal is defined as a contact signal if there are fingers or any other objects in close proximity to the surface of a capacitive touch panel 130 while the sensing signal is defined as a baseline signal if there is no finger or other object in close proximity to the surface of the capacitive touch panel 130. In S104, the controller 140 determines whether a touch signal $S_T$ has taken place by calculating of a signal difference between the contact signal and the baseline signal. When a touch is detected then the procedure flow proceeds to the step S105. The voltage magnitude of the touch signal must be above or equal to a default threshold value to be recognized to be a valid signal. In step S105, the voltage magnitude of the touch signal is compared with the default threshold value. If the voltage magnitude of the touch signal is above or equal to a default threshold value, then the procedure flow proceeds to the step S106 which can output the touch signal on the output connection. The touch signal is recognized to be an invalid signal as the voltage magnitude of the touch signal below a default threshold value, then the procedure flow proceeds to the step 107 which discarded the current touch signal and go back to perform next measurement cycles for touch signal recognition.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for a capacitive touch panel having a plurality of driving electrodes and a plurality of sensing electrodes, said method comprising:

a plurality of first measurement cycles, acquiring a plurality of first sample voltage values, each of the first measurement cycle comprising:
  (1) charging the driving electrode to a High electric potential by supplying a driving current to the driving electrode, wherein the sensing electrode is configured in a floating potential;
  (2) measuring the sensing voltage on the sensing electrode with a charge sensing circuit, wherein the sensing electrode is configured in a floating potential and coupled to the charge sensing circuit;
a plurality of second measurement cycles, acquiring a plurality of second sample voltage values, each of the second measurement cycle comprising:
  (1) charging the sensing electrode for a predetermined time interval by supplying a charging current while the driving electrode is driven continuously at the High electric potential, wherein the sensing electrode is configured in the floating potential and switched to be coupled to an charging circuit;
  (2) terminating charging the sensing electrode, wherein the sensing electrode is configured continuously in the floating potential;
  (3) measuring the sensing voltage on the sensing electrode with the charge sensing circuit, wherein the sensing electrode is configured in a floating potential and coupled to the charge sensing circuit while the driving electrode is switched to be configured in a ground potential; and
generating a sensing signal with calculating and processing of a plurality of difference sample voltage values between the first sample voltage values and the second sample voltage values, wherein the sensing signal is defined as a baseline signal if there is no any finger or other object in close proximity to the surface of the capacitive touch panel.

2. The method according to claim 1, wherein the driving electrodes and the sensing electrodes are initially configured in a ground potential, and the sensing electrodes are reset to be configured in a ground potential upon completion of acquiring the first plurality of voltage values.

3. The method according to claim 1, wherein the first measurement cycles are performed after the second measurement cycles in order.

4. The method according to claim 1, wherein the sensing signal is defined as a contact signal if there is a finger or other object in close proximity to the surface of the capacitive touch panel.

5. The method according to claim 4, wherein a signal difference between the contact signal and the baseline signal is defined as a touch signal, and the touch signal is recognized to be a valid signal and outputted when the voltage magnitude of the touch signal is above or equal to a default threshold value.

6. The method according to claim 4, wherein a signal difference between the contact signal and the baseline signal is defined as a touch signal, and the touch signal is recognized to be an invalid signal and discarded when the voltage magnitude of the touch signal is below a default threshold value.

7. A capacitive sensor device, comprising:
a plurality of driving electrodes and a plurality of sensing electrodes, and
a processing system respectively coupled to the driving electrodes and the sensing electrodes, said processing system for touch signal recognition is configured to:
  perform a plurality of first measurement cycles to acquire a plurality of first sample voltage values, each of the first measurement cycle comprising:
    (1) charging the driving electrode to a High electric potential by supplying a driving current to the driving electrode, wherein the sensing electrode is configured in a floating potential;
    (2) measuring the sensing voltage on the sensing electrode with a charge sensing circuit, wherein the sensing electrode is configured in a floating potential and coupled to an charge sensing circuit;
  perform a plurality of second measurement cycles to acquire a plurality of second sample voltage values, each of the second measurement cycle comprising:
    (1) charging the sensing electrode for a predetermined time interval by supplying a charging current while the driving electrode is driven continuously at the High electric potential, wherein the sensing electrode is configured in the floating potential and switched to be coupled to an charging circuit;
    (2) terminating charging the sensing electrode, wherein the sensing electrode is configured continuously in the floating potential;
    (3) measuring the sensing voltage on the sensing electrode with the charge sensing circuit, wherein the sensing electrode is configured in a floating potential and coupled to the charge sensing circuit while the driving electrode is switched to be configured in a ground potential; and
  generate a sensing signal by calculating and processing a plurality of difference sample voltage values between the first sample voltage values and the second sample voltage values, wherein the sensing signal is defined as a baseline signal if there is no finger or other object in close proximity to the surface of the capacitive touch panel.

8. The device according to claim 7, wherein the driving electrodes and the sensing electrodes are initially configured in a ground potential, and the sensing electrodes are reset to be configured in a ground potential upon completion of acquiring the first plurality of voltage values.

9. The device according to claim 7, wherein the first measurement cycles are performed after the second measurement cycles in order.

10. The device according to claim 7, wherein the sensing signal is defined as a contact signal if there is a finger or other object in close proximity to the surface of the capacitive touch panel.

11. The device according to claim 10, wherein a signal difference between the contact signal and the baseline signal is defined as a touch signal, and the touch signal is recognized to be a valid signal and outputted when the voltage magnitude of the touch signal is above or equal to a default threshold value.

12. The device according to claim 10, wherein a signal difference between the contact signal and the baseline signal is defined as a touch signal, and the touch signal is recognized to be an invalid signal and discarded when the voltage magnitude of the touch signal is below a default threshold value.

13. A capacitive touch apparatus, comprising:
a capacitive touch screen unit which comprises a plurality of driving electrodes and a plurality of sensing electrodes to form a plurality of capacitive sensors for sensing a touch;
a driving circuit operable to drive the driving electrodes for inducing charge onto the capacitive sensors;

a charge sensing circuit operable to perform a charge measurement;

a charging circuit operable to supply a charging current to the sensing electrodes; and a control unit coupled to the driving circuit, the charge sensing circuit, and the charging circuit, wherein the control unit is operable to perform operations for touch signal recognition comprising:

controlling to perform a plurality of first measurement cycles to acquire a plurality of first sample voltage values, wherein the driving electrodes are controlled to be charged to a High electric potential and the sensing electrodes are controlled to be configured in a floating potential and coupled to the charge sensing circuits and then the capacitive sensors are sequentially measured with the charge sensing circuits to acquire the first sample voltage values;

controlling to perform a plurality of second measurement cycles to acquire a plurality of second sample voltage values, wherein the sensing electrode are controlled to be charged for a predetermined time interval and terminated to be charged with the charging circuit and then the capacitive sensors are sequentially measured with the charge sensing circuits to acquire the second sample voltage values, and wherein the sensing electrodes are controlled to be configured in the floating potential while the driving electrodes are charged continuously at the High electric potential; and wherein the sensing electrodes are configured continuously in the floating potential as well as coupled to the charge sensing circuit while the driving electrodes are switched to be configured in a ground potential; and processing to generate a sensing signal by calculating a plurality of difference sample values between the first sample voltage values and the second sample voltage values, wherein the sensing signal is defined as a baseline signal if there is no finger or other object in close proximity to the surface of the capacitive touch panel.

14. The apparatus according to claim 13, wherein the sensing electrodes are coupled to the charging circuit during charging period.

15. The apparatus according to claim 13, wherein the sensing electrodes are coupled to the charge sensing circuit for measurement to acquire the second sample voltage values.

16. The apparatus according to claim 13, wherein the driving electrodes and the sensing electrodes are initially configured in a ground potential, and the sensing electrodes are reset to be configured in a ground potential upon completion of acquiring the first plurality of voltage values.

17. The apparatus according to claim 13, wherein the first measurement cycles are performed after the second measurement cycles in order.

18. The apparatus according to claim 13, wherein the sensing signal is defined as a contact signal if there is a finger or other object in close proximity to the surface of the capacitive touch panel.

19. The apparatus according to claim 18, wherein a signal difference between the contact signal and the baseline signal is defined as a touch signal, and the touch signal is recognized to be a valid signal and outputted when the voltage magnitude of the touch signal is above or equal to a default threshold value.

20. The apparatus according to claim 18, wherein a signal difference between the contact signal and the baseline signal is defined as a touch signal, and the touch signal is recognized to be an invalid signal and discarded when the voltage magnitude of the touch signal is below a default threshold value.

* * * * *